Patented Sept. 5, 1922.

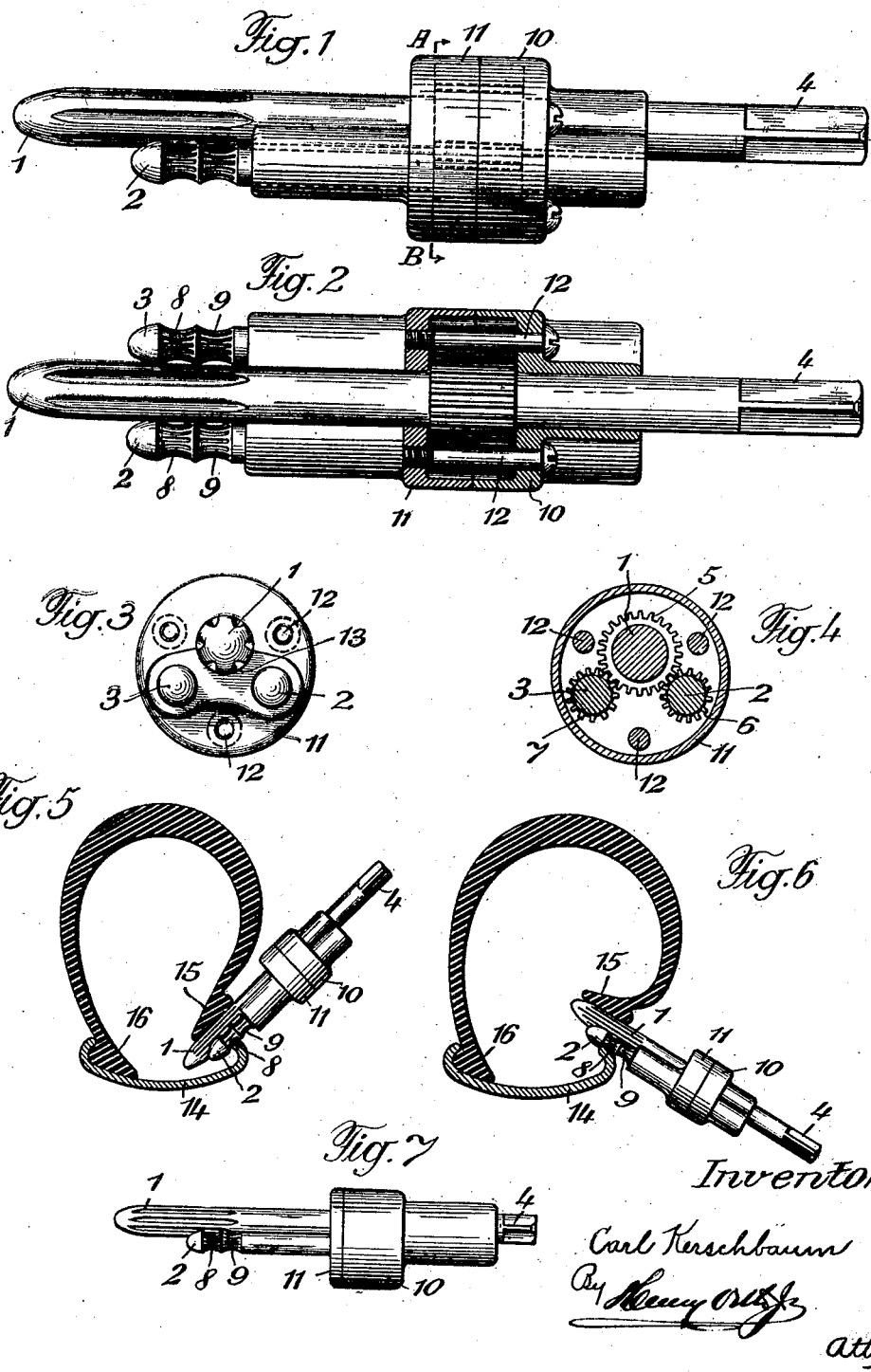

1,428,440

UNITED STATES PATENT OFFICE.

CARL KERSCHBAUM, OF HINWIL, SWITZERLAND, ASSIGNOR TO THE FIRM STÖSSEL & CIE., OF WADENSWIL, SWITZERLAND.

DEVICE FOR MOUNTING AND REMOVING TIRES.

Application filed January 28, 1921. Serial No. 440,766.

*To all whom it may concern:*

Be it known that I, CARL KERSCHBAUM, a citizen of the Republic of Switzerland, residing at Hinwil, Switzerland, have invented certain new and useful Improvements in a Device for Mounting and Removing Tires; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

The object of the present invention is a device for mounting and removing tires and it consists of rotatably mounted members adapted to be inserted between the rim of a wheel and a tire some of said members supporting and guiding the tire the others bearing on the rim, whereby these members are in frictional engagement with the tire and the rim and upon rotating said members a displacement of the device along the rim takes place. According to the angle at which the device is applied with regard to the plane of the wheel the displacement of the device causes the tire to bed itself into the rim or to be lifted off the rim.

With the aid of this device a quick and faultless mounting and removing of tires of any size may be effected without injuring the tires. The device replaces therefore in an advantageous way the car tire levers used heretofore for this purpose.

Two modes of carrying the invention into effect are illustrated on the accompanying drawing, in which:

Fig. 1 is a side view of a device according to the invention;

Fig. 2 is a horizontal section through the device;

Fig. 3 illustrates an end view,

Fig. 4 is a cross-section along line A—B of Fig. 1;

Fig. 5 shows the device in its operative position when applied to mount a tire (the air tube being omitted in the drawing).

Fig. 6 shows the device in its operative position for removing a tire.

Fig. 7 shows on a smaller scale in a side view a modified device.

The device illustrated in Figs. 1–4 comprises three members 1, 2 and 3 which can be rotated around their respective axes. The rear end of member 1 is provided with a square 4, with which a brace or some other implement may co-act in order to impart rotation to said member. At its front end the member 1 is pointed and its periphery adjacent to the front end is fluted over a certain length. Approximately in the middle of its length the member 1 is provided with teeth 5, preferably cut into the thickened body of member 1. The teeth 5 mesh with teeth 6 and 7 with which the members 2 and 3 respectively are provided. The members 2 and 3 rotate in an opposite direction to member 1. The members 2 and 3 are provided in their front part with circular grooves 8 and 9 fluted in the axial direction. The members 1, 2 and 3 are mounted in a casing, which may be composed of two halves 10 and 11 held together by screws 12, or the casing part 10 may be provided with a cover 11 joined thereto (Fig. 7), which casing completely incloses the toothed portions of the members. In the constructional example illustrated in Figs. 1–4, the front parts of the members 2 and 3 are journalled in said casing nearly over their whole length so that they are enabled to stand considerable lateral thrust. The member 1 is not enclosed by the casing on its front half but rests on a bearing surface 13 provided by said casing (Fig. 3). The fact, that the upper surface of the front part of member 1 is not covered by the casing presents the advantage that the tire acted upon by said upper part of the periphery of member 1 when being mounted or removed can glide unrestrictedly on said part.

The casing may also be constructed to enclose all three members to the same extent in length, as is shown in Fig. 7, but in order to enable the tire to glide freely on the cooperating member 1, the whole casing must be set further back from the front end of the members.

When using the device to mount a tire to a rim the front parts of the members of the device are inserted between the rim 14 and the bead 15 of the tire to be mounted and the device is inclined in a manner shown in Fig. 5. The members 2 and 3 rest with their front grooves 8 on the edge of the rim whereby the device is properly supported and guided and the bead of the tire rests upon the fluted part of member 1. If found necessary the bead may be secured in this position by inserting an iron between rim and tire adjacent to the device. Upon a rotation imparted to member 1 by means of a brace or other implement acting on the square end of said member the device is moved along the rim. Upon a rotation to the right the device is moved towards the left, the member 1 rolling on the bead of the tire and the members 2 and 3 rolling along the rim. By this movement the bead of the tire is brought into such a position that it is bedded down in the rim to the same degree as the device moves along the rim.

In order to remove a tire the device is forced in between the tire and the rim and then brought into an inclination against the plane of the wheel as is shown in Fig. 6. A rotation of the member 1 causes again a displacement of the whole device along the rim of the wheel, whereby the bead of the tire is lifted out of the rim.

If the grooves 9 of members 2 and 3 are placed on the rim the member 1 projects further over the one edge of the rim, so that the opposite bead 16 of the tire can also be acted upon when mounting or removing the tire according to the inclination at which the device is held against the plane of the wheel.

The members 2 and 3 may also be provided with only one circular groove.

I claim:

1. Implement for mounting and demounting pneumatic tires, comprising three positively rotated members, two of which serve to guide the implement on a wheel rim edge, while the third member is cylindrical and terminates in a pointed end extending beyond the other two members.

2. In an implement for mounting and demounting pneumatic tires, a casing, three rotatable members mounted therein, gearing positively connecting the members together, one of said members having a long and pointed end extending beyond the casing and beyond the ends of the other two members, said casing forming a guard shoulder against which the tire may strike as it slips along the long member.

3. In an implement for mounting and demounting pneumatic tires, three positively rotated cylindrical members all of which terminate in pointed ends and one of which extends beyond the others for supporting and guiding the tire bead and has its cylindrical surface fluted.

4. In an implement for mounting and demounting pneumatic tires, a casing, a long cylindrical member therein having a squared driving end and a fluted and pointed operating end, two cylindrical rotatable guide members mounted in said casing and positively driven from the other member, said guide members pointed at their ends, extending a lesser extent from the casing and having a plurality of guide groves adjacent their pointed ends.

In testimony that I claim the foregoing as my invention I have signed my name.

CARL KERSCHBAUM.